United States Patent
Yonemori et al.

(10) Patent No.: US 10,014,752 B2
(45) Date of Patent: Jul. 3, 2018

(54) COOLING STRUCTURE OF ELECTRIC MOTOR

(71) Applicant: MAZDA MOTOR CORPORATION, Hiroshima (JP)

(72) Inventors: Kei Yonemori, Hiroshima (JP); Nobuhide Seo, Hirsohima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 223 days.

(21) Appl. No.: 15/184,376

(22) Filed: Jun. 16, 2016

(65) Prior Publication Data

US 2016/0380517 A1 Dec. 29, 2016

(30) Foreign Application Priority Data

Jun. 23, 2015 (JP) ................................. 2015-125336
Jun. 23, 2015 (JP) ................................. 2015-125337
Jun. 23, 2015 (JP) ................................. 2015-125338
Aug. 7, 2015 (JP) ................................. 2015-157129

(51) Int. Cl.
    *H02K 9/22* (2006.01)
(52) U.S. Cl.
    CPC ..................... *H02K 9/22* (2013.01)
(58) Field of Classification Search
    CPC ........................................................ H02K 9/22
    USPC .............................................. 310/53, 64, 66
    IPC ........................................................ H02K 9/22
    See application file for complete search history.

(56) References Cited

U.S. PATENT DOCUMENTS

| 6,777,835 | B1 * | 8/2004 | Sines | H01F 27/22 310/179 |
| 6,856,053 | B2 * | 2/2005 | LeFlem | H02K 3/47 310/194 |
| 6,888,286 | B2 * | 5/2005 | Howard | H02K 3/24 310/254.1 |
| 7,589,441 | B2 * | 9/2009 | Kalsi | H02K 1/12 310/180 |
| 8,513,842 | B2 * | 8/2013 | Iwasaki | H02K 9/22 310/410 |
| 2011/0245883 | A1 * | 10/2011 | Dall | A61B 17/7035 606/305 |
| 2016/0380517 | A1 * | 12/2016 | Yonemori | H02K 9/22 310/53 |

FOREIGN PATENT DOCUMENTS

JP 2014225971 A 12/2014

* cited by examiner

*Primary Examiner* — John K Kim
(74) *Attorney, Agent, or Firm* — Studebaker & Brackett PC

(57) ABSTRACT

A cooling structure of an electric motor comprising a rotor, a stator provided with a wound stator coil, and a housing accommodating the rotor and the stator, wherein a coil end of the stator is spaced apart from an inner wall of the housing. The cooling structure comprises a thermally-conductive member which is provided to thermally connect the housing and the coil end and includes a laminated graphite sheet, and an airbag which is configured to be deployed in a space portion between the inner wall of the housing and the coil end so as to press at least a portion of the thermally-conductive member against the coil end by means of a pressure of pressurized air therein.

7 Claims, 8 Drawing Sheets

COOLING STRUCTURE OF ELECTRIC MOTOR

BACKGROUND OF THE INVENTION

The present invention relates to a cooling structure of an electric motor, and in particular relates to the cooling structure of the electric motor using a graphite sheet.

Conventionally, the electric motor has been used in various fields. The electric motor is rotated by converting supplied electric energy to kinematic energy. At this moment, part of the electric energy is converted to thermal energy, so that some heat is generated. Meanwhile, it is necessary to provide air insulation between an inner wall of a housing and a coil end of a stator from a safety perspective. Accordingly, the inner wall of the housing is configured to be spaced apart from the coil end of the stator, thereby providing a space portion between them. In this case in which there exists the space portion between the inner wall of the housing and the coil end, it is difficult to increase the thermal conductivity from the coil end to the housing, so that the temperature inside the electric motor tends to become high. In particular, the heat value of a large-sized (high capability) electric motor which is used for an electric car is high, which causes deterioration of the electric-motor efficiency. Therefore, various types of cooing technology have been proposed as its countermeasures.

A cooling structure of an electric motor disclosed in Japanese Patent Laid-Open Publication No. 2014-225971 comprises a rotor, a stator provided with a wound stator coil, a housing accommodating the rotor and the stator, a first reservoir for lubricant oil provided between a coil end positioned on an one-end side of the stator and the housing, a second reservoir for lubricant oil provided between another coil end positioned on the other-end side of the stator and the housing, and a connecting passage interconnecting the first and second reservoirs, wherein an upper-side portion of the connecting passage is located at a higher level than an oil surface of the lubricant oil stored in the first and second reservoirs. Thereby, the coil end is sunk into the lubricant oil, suppressing the lubricant oil from staying in the connecting passage, thereby performing cooling of the coil end.

In recent years, graphene (graphene sheet) has attracted attention as a material having a high mobility of charged particles (electrons). The graphene is a type of laminated crystal in which carbon atoms are coupled to each other in a hexagonal mesh shape, i.e., a type of graphite, and a single layer crystal having a thickness of a single atom is called the graphene, in particular. The mobility of the charged particles in the graphene is 15000 $cm^2/Vs$ at room temperature, and expression (exhibition) of characteristics relating to the mobility (electricity, heat, strength etc.) is limited to a plane direction.

The cooling structure of the electric motor disclosed in the above-described patent document can suppress the lubricant oil from staying in the connecting passage, without forming any ventilation hole inside the housing, by using the space portion for insulation as the reservoir of the lubricant oil. This cooling structure of the electric motor, however, is a so-called wet-type cooling in which the coil end is sunk into the lubricant oil (that is, a cooling type having heat exchange with the lubricant oil). Therefore, this type requires providing the lubricant oil and the oil passage for circulating the lubricant oil, and also needs maintenance of the lubricant oil and the like, so that there is a concern that manufacturing costs may increase improperly. Further, in a case of the large-sized electric motor, a temperature-increase speed is so fast (about 200° C. increases in 3 sec, for example) that there is a concern that the wet-type cooling by using the lubricant oil may lack a cooling capability for each component in the electric motor. Additionally, while the technology of the above-described patent document achieves further improvement of the cooling capability inside the electric motor by forming an additional cooling-water passage in a wall part of the housing in addition to the cooling mechanism by using the lubricant oil, there are still problems of a complex structure and costs and the like.

Since it is known that the graphene is superior in the thermal conductivity under a certain use condition as described above, it may be considered that the graphene or a graphene laminate (hereafter, these two will be referred to as "graphite sheet" collectively) is utilized for a cooling mechanism. In a case in which the graphite sheet is utilized for the cooling mechanism, it is necessary to set its application part, application form, or the like, considering specificity that physical property values are greatly different between a plane direction and a thickness direction (perpendicular-to-plane direction).

According to results of studies done by the present inventors, it has been found that even if the graphite sheet is face contacted to the coil end as a cooling object, the sufficient quantity of heat is not transmitted to the graphite sheet from the coil end unless the uniform face contact is done with a specified pressing force or greater, so that a desired cooling capability cannot be ensured. Herein, since a structure of the space portion for insulation where the coil end is arranged is narrow and complex, it is not easy to face contact the graphite sheet to the coil end with the uniform pressing force.

SUMMARY OF THE INVENTION

An object of the present invention is to provide a cooling structure of an electric motor which can improve the cooling capability by face contacting the thermally-conductive member including the graphite to the coil end with the uniform pressing force.

The present invention is a cooling structure of an electric motor which comprises a rotor, a stator with a wound stator coil, and housing accommodating the rotor and the stator, wherein a coil end of the stator is spaced apart from an inner wall of the housing, the cooling structure of the electric motor comprising a thermally-conductive member provided to thermally connect the housing and the coil end and including a laminated graphite sheet, and an airbag configured to be deployed in a space portion between the inner wall of the housing and the coil end so as to press at least a portion of the thermally-conductive member against the coil end by means of a pressure of pressurized air therein.

In the above-described present invention, the meaning of "to thermally connect the housing and the coil end" includes not only a manner in which the thermally-conductive member is directly contacted to the housing and the coil end but another manner in which the thermally-conductive member is contacted to the housing and the coil end via some member which is superior in the thermal conductivity. Further, the meaning of "laminated" of "a laminated graphite sheet" includes both a manner in which plural separated graphite sheets are piled up in a thickness direction and another manner in which a single sheet of graphite is folded into plural layers.

According to the present invention, since the thermally-conductive member including the laminated graphite sheet is provided to thermally connect the housing and the coil end, the coil end can be sufficiently cooled by heat radiation from the coil end to the housing by way of the thermally-conductive member. Further, since the airbag storing the pressurized air is deployed in the space portion between the inner wall of the housing and the coil end, the thermally-conductive member can be face contacted to the coil end with the uniform pressing force regardless of a shape of the space portion. Thus, the cooling structure of the present invention can cool the coil end sufficiently, properly ensuring an air insulation layer (space portion) which is necessary between the coil end and the housing from the safety perspective.

In the present invention, it is preferable that the thermally-conductive member is composed of plural elements arranged in a circumferential direction inside the space portion, and the airbag comprises a single bag body configured to collectively press the plural elements of the thermally-conductive member. Thereby, the thermally-conductive member composed of the plural elements can be collectively pressed by the airbag (bag body) having a relatively simple shape.

The above-described housing can comprise a tubal housing body surrounding an outer periphery of the rotor and the stator and a housing end member closing an end portion, in an axial direction, of the hosing body. In this case, it is preferable that the above-described airbag is provided between an end portion, in an axial direction, of the coil end and the housing end member so as to press the thermally-conductive member in a thickness direction of the thermally-conductive member against the end portion, in the axial direction, of the coil end.

Further, it is preferable that there is further provided a position regulating mechanism configured to regulate a position, in a radial direction, of the airbag relative to the housing end member. Thereby, the thermally-conductive member can be properly pressed against the coil end by the airbag whose position is regulated at a specified radial position relative to the housing end member.

It is preferable that the airbag comprises a bag body configured to be deployed between the end portion, in the axial direction, of the coil end and the housing end member, an introduction portion provided to penetrate the hosing end member and introduce the pressurized air into the bag body, and a valve provided at the introduction portion. Thereby, since the airbag can be deployed after the airbag in a non-deployment state is attached, the assembling workability can be improved and also pressure controlling of the airbag can be facilitated.

It is preferable that there is provided a fixation device to fix the thermally-conductive member to the housing, and the thermally-conductive member have a slack part at a position between a portion thereof which is pressed against the coil end by the airbag and another portion thereof which is fixed to the housing by the fixation device, the slack part being configured to be bent and not be fixed to any member. Thereby, since the slack part serves as a portion which can suppress a large tension from acting on the thermally-conductive member, which is caused by thermal contraction of the housing or the like, any damage of the thermally-conductive member can be prevented.

It is preferable that there is provided a fastening member to fixedly fasten the thermally-conductive member to the housing, the thermally-conductive member has a through hole and plural slits configured to radically extend from the through hole at a portion thereof which is fixedly fastened to the housing by the fastening member, and the fastening member is configured to penetrate the through hole and bend a portion of the thermally-conductive member which is positioned between or among the slits in a fastening direction. Thereby, since the heat is transmitted to the housing from the thermally-conductive member via the fastening member in addition to the heat being transmitted directly to the housing from the thermally-conductive member, the thermal conductivity can be improved, thereby cooling the coil end sufficiently.

Other features, aspects, and advantages of the present invention will become apparent from the following description which refers to the accompanying drawings.

DETAILED DESCRIPTION OF THE INVENTION

Figure 1:
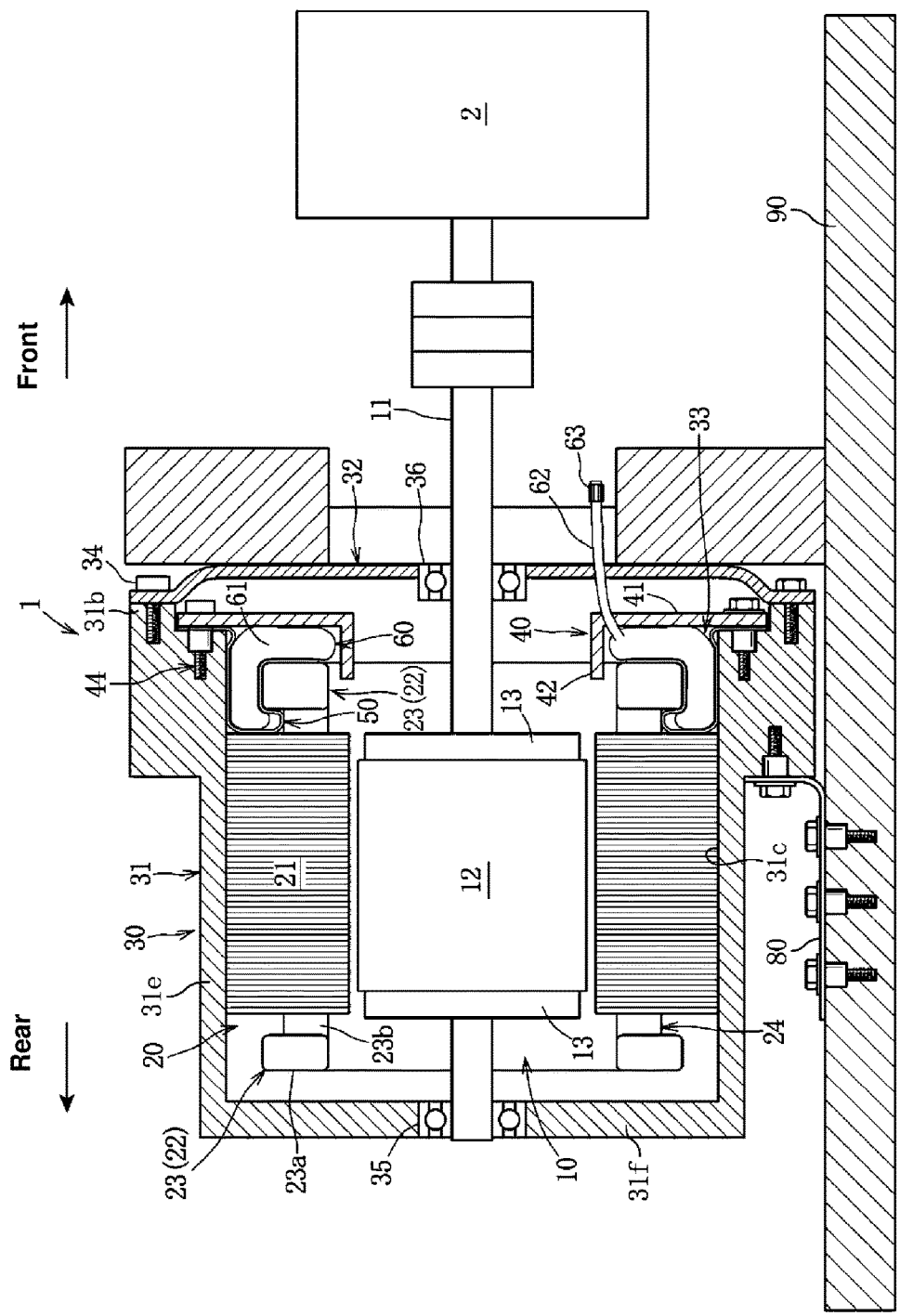
FIG. 1 is a vertical sectional view of an electric motor according to a first embodiment of the present invention.

Hereafter, preferred embodiments of the present invention will be described specifically referring to the drawings. Herein, the embodiments described below merely show preferable specific examples which are applied to a permanent magnet synchronous motor, and do not intend to limit the present invention, the present invention's applied object or use.

Embodiment 1

Hereafter, a first embodiment of the present invention will be descried referring to FIGS. 1-8. As shown in FIG. 1, an electric motor 1 comprises a cylindrical rotor 10, a stator 20 which is arranged on an outer peripheral side of the rotor 10, a cylindrical housing 30 which accommodates the rotor 10 and the stator 20 therein, a controller (not illustrated) which supplies an alternating current which is controlled in accordance with a required output and the like to the stator 20. The electric motor 1 is configured such that the rotor 10 stored inside the stator 20 is rotated by a magnet field which is generated by a flow of the alternating current to the stator 20 from the controller.

The rotor 10 will be described, first. As shown in FIG. 1, the rotor 10 comprises a rotor shaft 11 which serves as an output shaft of the electric motor 1 as well, a rotor core 12, and a pair of right-and-left end plates 13. The rotor shaft 11 is connected to a load device 2 at its one end portion. At the housing 30 are provided a journal 35 to support the other end portion of the rotor shaft 11 and a journal 36 to support a midway portion (a portion between the load device 2 and the rotor core 12) of a one-end side of the rotor shaft 11. That is, the rotor shaft 11 is rotatably supported at the housing 30 via the journals 35, 36. Hereafter, a direction which is parallel to a shaft center of the rotor shaft 11 will be referred to as an "axial direction," a direction which is perpendicular to the shaft center of the rotor shaft 11 will be referred to as a "radial direction," and a circumferential direction of a circle having a circular center at the shaft center of the rotor shaft 11 will be referred to as a "circumferential direction." Further, one side of the axial direction which is positioned closer to the load device 2 (i.e., an output side) will be referred to as "front," and the other side will be referred to as "rear."

The rotor core 12 comprises a body portion (not illustrated) made of plural electromagnetic steel plates which are laminated in the axial direction and formed integrally by thermo-compression bonding or the like and plural permanent magnets (not illustrated) arrayed in the circumferential direction at an outer periphery of the body portion. The rotor core 12 is attached onto the rotor shaft 11 and locked so as not to rotate freely relative to the rotor shaft 11. The pair of right-and-left end plates 13 are provided at both end portions, in the axial direction, of the rotor core 12 for positioning of the rotor core 12 relative to the rotor shaft 11.

Figure 2:
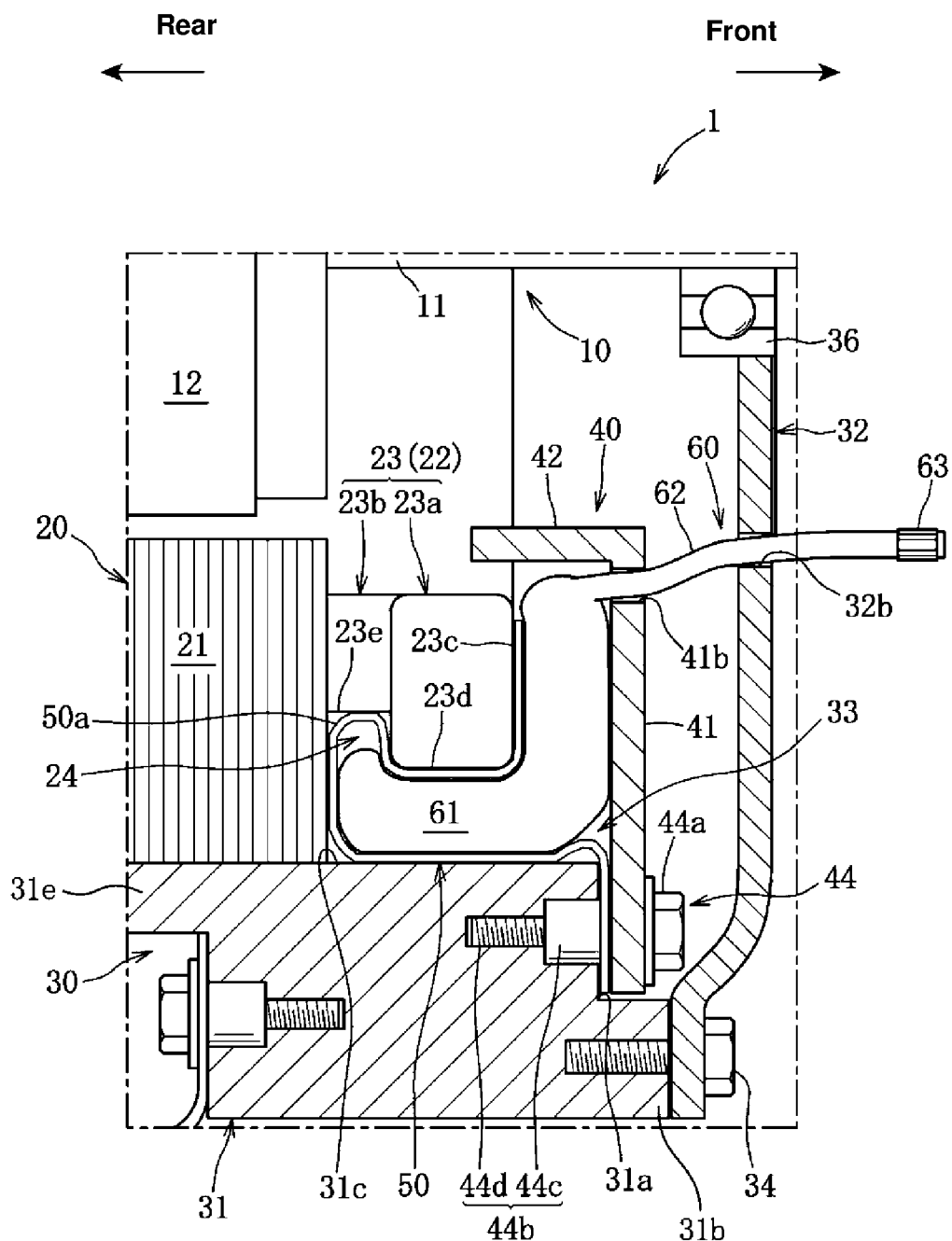
FIG. 2 is a major-part enlarged view showing a surrounding part of an airbag in FIG. 1.
Figure 4:
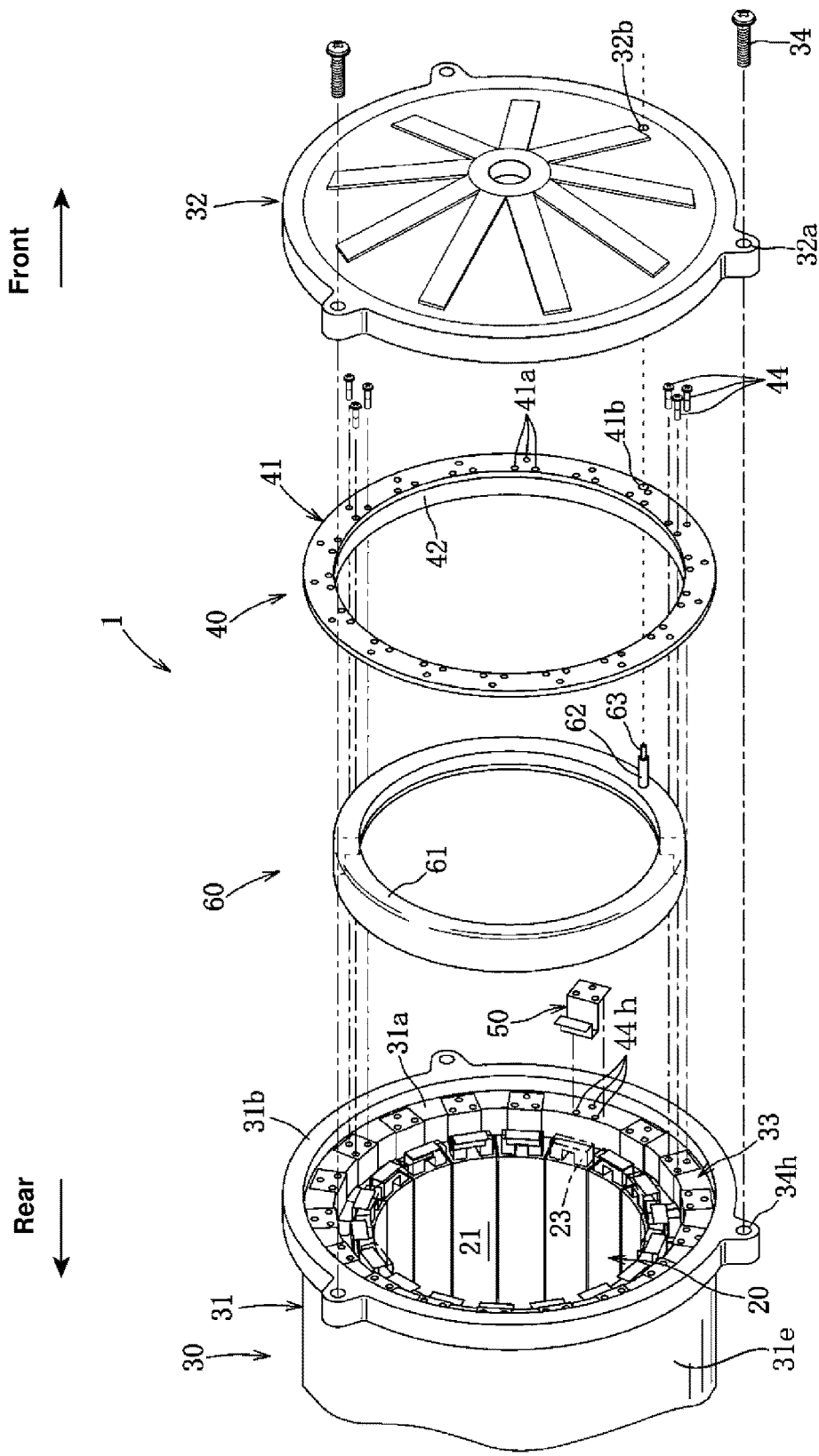
FIG. 4 is an exploded perspective view of main components of the electric motor.

Next, the stator 20 will be described. As shown in FIGS. 1, 2 and 4, the stator 20 comprises a stator core 21 and a stator coil 22. The stator core 21 comprises plural electromagnetic steel plates which are laminated in the axial direction and formed integrally by the thermo-compression bonding or the like. The stator core 21 is attached to an inner peripheral face 31c of the housing 30 so as not be rotatable. The inner peripheral face of the stator core 21 is provided to face an outer peripheral face of the rotor core 12 with a small gap between them. Plural ribs (not illustrated) are provided to project at the stator core 21 such that they are arrayed at equal intervals in the circumferential direction, and at the ribs is provided the stator coil 22 which are composed of a U-phase coil group, a V-phase coil group, and a W-phase coil group in which some cupper-made enameled wires are wound in a specified pattern.

The stator coil 22 includes a pair of front-and-rear coil ends 23 which are folded back in a state of projecting outward from both-end portions (a front end portion and a rear end portion) of the axial direction of the stator core 21. As shown in FIGS. 1 and 2, the pair of front-and-rear coil ends 23 respectively comprise a large-diameter portion 23a which is provided away from the stator core 21 and a small-diameter portion 23b which is provided between the large-diameter portion 23a and the stator core 21, and has a narrower width, in the radial direction, than the large-diameter portion 23a. At longitudinal-both sides of the stator core 21 are, respectively, provided a ring-shaped recess portion 24 which is partitioned by a vertical wall portion (a front end face or a rear end face) of the stator core 21, the small-diameter portion 23b, and the large-diameter portion 23a so as to be recessed inward in the radial direction.

An insulating heat-dissipation paste is applied on the respective surfaces of the pair of front-and-rear coil ends 23 (the large-diameter portion 23a and the small-diameter portion 23b). A material capable of ensuring the thermal conductivity and the heat-dissipation property as well as the insulating property, such as a paste produced by a hydrolysis reaction of an alcoxide compound and a silanol dehydration condensation reaction, may be used as this insulating heat-dissipation paste. Herein, this insulating heat-dissipation paste is applied to the vertical wall portion of the stator core 21 as well.

A manner of wire winding of the stator coil 22 can be basically classified into a concentrated-winding type and a distribution-winding type. In the concentrated-winding type, since there is no overlapping of magnet poles of the phases and an interference of the stator coils 22 is small, the length, in the axial direction, of the coil end 23 can be shortened. However, since the use amount of the magnet per output torque is large, the cogging torque becomes improperly high. In the distribution-winding type, meanwhile, since the magnet poles of the phases overlap each other partially and the stator coils 22 cross each other at the coil end 23, the length, in the axial direction, of the coil end 23 becomes longer and the shape become more complex. But, since the use amount of the magnet per output torque become smaller, the cogging torque becomes lower. The present embodiment uses the distribution-winding type having the longer length of the coil end 23 for ensuring a large exposed area of the coil end 23 which is exposed from the stator core 21.

Figure 3:
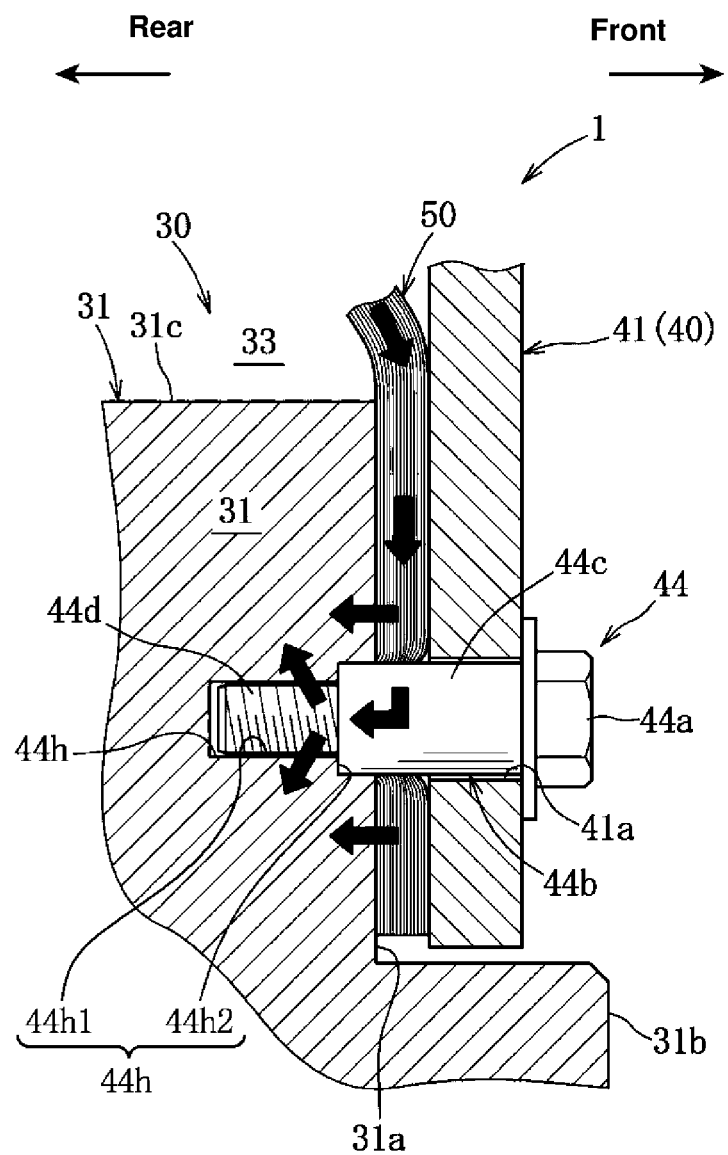
FIG. 3 is a major-part enlarged view showing around a fixation portion of the thermally-conductive member and a housing in FIG. 2.

Subsequently, the housing 30 will be described. The housing 30 comprises, as shown in FIGS. 1-4, a tubal housing body 31 with a bottom floor and a roughly circular-plate shaped housing end member 32 which closes a front-side opening of the housing body 31. The housing body 31 and the housing end member 32 are made from aluminum alloy so as to quickly dissipate heat generated at the electric motor 1 to the outside. An attaching hole which is considerably wider than the rotor shaft 11 is formed at a central portion of a rear wall 31f of the housing body 31, and the journal 35 to support a rear end portion of the rotor shaft 11 is attached to this attaching hole. At a front end portion of the housing body 31 is formed a ring-shaped recess portion 31a which is configured such that an inward area, in the radial direction, of the front end portion is recessed rearward. Plural bolt holes 44h are formed at the recess portion 31a, and plural (three) bolt holes 34h are formed at an outer peripheral front end wall 31b which is positioned on an outward side, in the radial direction, of the recess portion 31a. These plural (three) bolt holes 34h are provided to be distributed at equal intervals in the circumferential direction at the outer peripheral front end wall 31b. As shown in FIG. 3, the bolt hole 44h is configured to have a specified wall depth from a wall surface of the recess portion 31a, and comprises a screw portion 44h1 into which a thermally-conductive bolt 44 (described later) is screwed and a seat portion 44h2 which has a wider diameter than the screw portion 44h1.

An attaching hole which is considerably wider than the rotor shaft 11 is formed at a central portion of the housing end member 32, and the journal 36 to support a front portion of the rotor shaft 11 is attached to this attaching hole. Plural (three) insertion holes 32a and a single air introduction hole 32b are formed at the housing end member 32. The plural (three) insertion holes 32a are respectively formed at plural (three) boss portions which are provided to be distributed at equal intervals in the circumferential direction at an outer-most peripheral portion of the housing end member 32. The air introduction hole 32b is formed at a middle portion, in the radial direction, of the housing end member 32, and penetrates the housing end member 32 in the axial (thickness) direction. The housing end member 32 is fixed to the housing body 31 by fastening bolts 34 which are inserted into the insertion holes 32a to the bolt holes 34h.

As shown in FIGS. 1 and 2, air insulation is provided between the pair of front-and-rear coil ends 23 and the hosing 30. That is, the rear-side coil end 23 is provided to be spaced apart from the rear wall 31f and a peripheral wall 31e of the housing body 31, and the front-side coil end 23 is provided to be spaced apart from the peripheral wall 31e of the housing body 31 and the housing end member 32.

Plural thermally-conductive members 50 are attached to the front-side coil end 23. The plural thermally-conductive members 50 are attached so as to contact a front end of the coil end 23, and arranged at equal intervals in the circumferential direction with small pitch. In the present embodiment, the thermally-conductive members 50 (and an airbag 60 described later) are attached only to the front-side coil end 23, so a surrounding structure of the front-side coil end 23 will be described mainly. Herein, the thermally-conductive members 50 (and the airbag 60) may be attached to both of the front-side and rear-side coil ends 23, differently from the present embodiment.

An aluminum-alloy-made pressing plate 40 is attached between the front-side coil end 23 and the housing end member 32. Further, the airbag 60 which presses the plural thermally-conductive members 50 with a specified pressing force is provided behind the pressing plate 40.

In accordance with attaching of the pressing plate 40 between the coil end 23 (the large-diameter portion 23a and the small-diameter portion 23b), there is a space portion 33 which is partitioned by a front end face 23c of the large-diameter portion 23a, an outer peripheral face 23d of the large-diameter portion 23a, an outer peripheral face 23e of the small-diameter portion 23b, an inner peripheral face 31c of the housing body 31, and the pressing plate 40. The airbag 60 is configured to press the thermally-conductive members 50 against the coil end 23 by being deployed in the space portion 33.

As shown in FIGS. 1-4, the pressing plate 40 comprises a ring portion 41 and a cylindrical portion 42. The ring portion 41 is arranged perpendicularly to the shaft center of the rotor shaft 11. The pressing plate 40 is fixed to the housing body 31 by fastening an outer peripheral edge portion of the ring portion 41 to the recess portion 31a of the housing body 31 with the plural thermally-conductive bolts 44 (corresponding to a fixation device or a fastening member of the present invention). An inner peripheral edge of the ring portion 41 is arranged substantially at the same position, in the radical direction, as the inner peripheral face of the stator core 21 when the pressing plate 40 is fixed to the recess portion 31a. The ring portion 41 has plural insertion holes 41a for insertion of the thermally-conductive bolts 44. The plural insertion holes 41a are arranged in the circumferential direction, and one set of them consists of three holes which are arranged at positions corresponding to apexes of an equilateral triangle as shown in FIG. 4. Further, an air introduction hole 41b is formed at a position of the pressing plate 40 which corresponds to the air introduction hole 32b. The cylindrical portion 42 is configured to project rearward from its inner peripheral edge of the ring portion 41, and extends in parallel to the shaft center of the rotor shaft 11 up to a position which faces the inner peripheral face of the large-diameter portion 23a of the coil end 23. A rear end portion of the cylindrical portion 42 is provided to be spaced apart from the inner peripheral face of the large-diameter portion 23a in the radial direction.

Next, the plural thermally-conductive members 50 will be described. The plural thermally-conductive members 50 constitute a dry-type cooling mechanism to cool the coil end 23 by transmitting the quantity of heat inputted from the coil end 23 to the inner peripheral face 31c of the housing 30 and the like. These plural thermally-conductive members 50 are provided to be arrayed at equal intervals in the circumferential direction in the space portion 33. Herein, each of the plural thermally-conductive members 50 has the same structure, so the single thermally-conductive member 50 will be described as an example.

Figure 5:
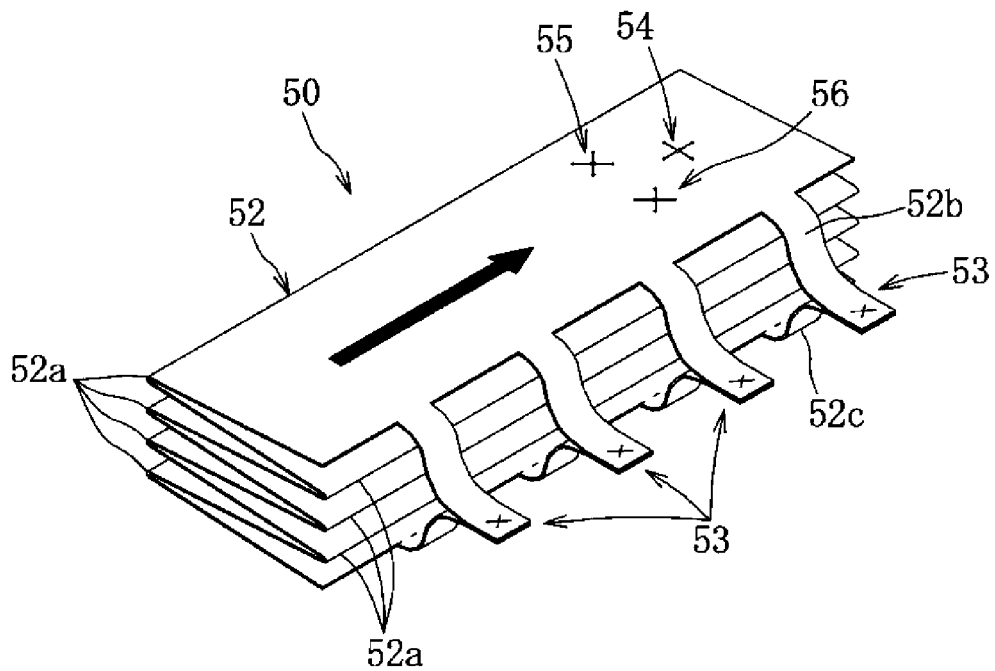
FIG. 5 is a perspective view of the thermally-conductive member itself.
Figure 6:
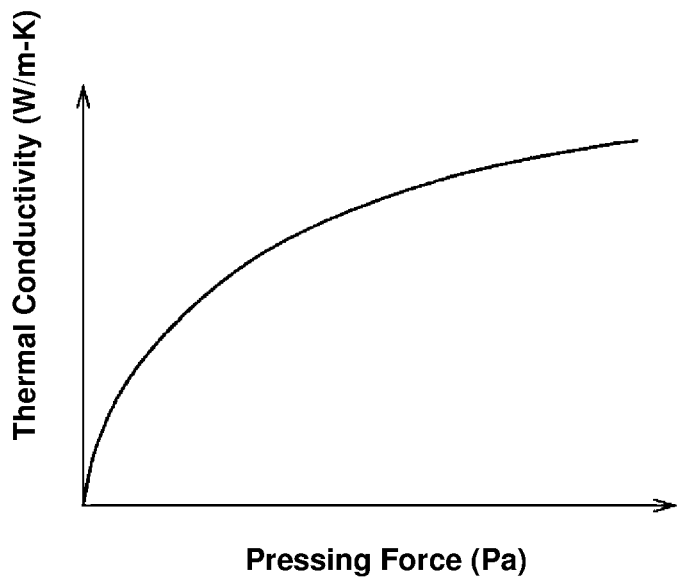
FIG. 6 is a graph showing a relationship of a pressing force and a thermal conductivity of a graphite sheet.

As shown in FIG. 5, the thermally-conductive member 50 comprises a graphite sheet 52 which is made of a laminated carbon-atom crystal. The graphite sheet 52 is formed in a sheet shape having a thickness of about 75 μm, for example. In the present embodiment, this graphite sheet 52 is folded back even-number times, twenty-eight times, for example, with parallel two-side folding lines 52a, thereby forming the long thermally-conductive member 50 having the thickness of about 2 mm. The mobility, in a plane direction, of charged particles (electrons) in this graphite sheet 52 is 15000 $cm^2/Vs$ at room temperature, which performs the superior thermal conductivity (1000-1500 W/m·K). As shown in FIG. 6, the graphite sheet 52 has properties that the thermal conductivity more increases as the pressing force for a heat source in a thickness direction (perpendicular-to-plane direction) becomes greater, and the thermal conductivity converges at a point the pressing force has become sufficiently great.

The quantity of heat inputted to a lowermost layer of the graphite sheet 52 of the thermally-conductive member 50 shown in FIG. 5 is transmitted to an uppermost layer of the graphite sheet 52 by way of the plural folding lines 52a with a high thermal conductivity.

Figure 7:
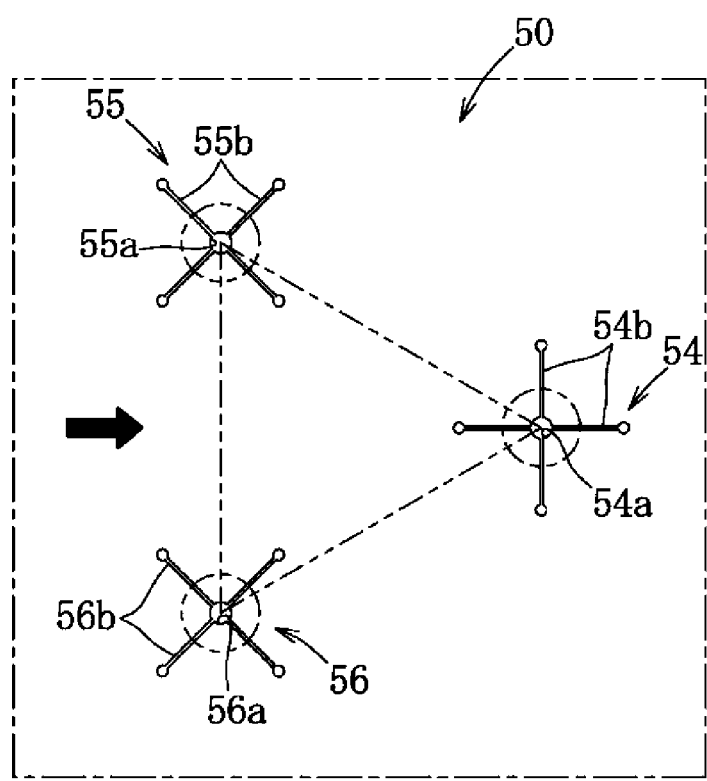
FIG. 7 is a plan view showing a surrounding part of an insertion portion of the thermally-conductive member.

Further, the quantity of heat inputted to a one-end portion of the lowermost layer of the graphite sheet 52 of FIG. 5 is transmitted to the other end portion by way of all of the layers of the graphite sheet 52 as shown by an arrow in FIG. 7.

As shown in FIG. 5, the thermally-conductive member 50 includes four connection portions 53 which are arrayed at equal intervals in its longitudinal direction. Further, three insertion portions 54-56 are formed at the vicinity of an end portion, in the longitudinal direction, of the thermally-conductive member 50. The four connection portions 53 respectively comprise an extension portion 52b which extends from a long side of one side of the lowermost layer of the graphite sheet 52 and another extension portion 52c which extends from a long side of one side of the uppermost layer of the graphite sheet 52, which are joined together with an adhesive agent or the like. Further, all of the folding lines 52a which are positioned at another long side on the other side of the graphite sheet 52 are joined together by the adhesive agent or the like, so that the thermally-conductive member 50 which is folded and capable of keeping its long shape is formed.

As shown in FIGS. 5 and 7, the three insertion portions 54-56 are arranged at positions corresponding to apexes of a roughly equilateral triangle. The insertion portion 54 is positioned on a downstream side of the heat-transmission direction shown by the arrows in FIGS. 5 and 7, and the insertion portions 55, 56 are positioned on an upstream side of the insertion portion 54. These three insertion portions 54-56 are provided to overlap with the three bolt holes 44h (the seat portions 44h2) formed at the housing body 31 (the recess portion 31a), respectively, when the thermally-conductive member 50 is fixed to the housing body 31. As shown in FIG. 7, the insertion portion 54 (55, 56) includes an insertion hole 54a (55a, 56a) which has a smaller diameter than a sleeve portion 44c (described later) of the thermally-conductive bolt 44 and plural slits 54b (55b, 56b) which extends radially from the insertion hole 54a (55a, 56a) at 90-degree intervals. As shown in FIG. 7, the slits 54b of the insertion portion 54 positioned on the downstream side of the heat-transmission direction are configured to extend in parallel and perpendicular directions, respectively, and formed in a cross shape as a whole. The slits 55b (56b) of the other insertion portions 55, 56 are, in order to ensure a width of a heat-transmission passage to the maximum extent, configured to extend in a direction inclined by 45 degrees to the heat-transmission direction and in another direction inclined by 135 degrees to the heat-transmission direction, respectively, and formed in an X shape as a whole. The respective slits 54b, (55b, 56b) have circular holes for anti-tearing at their tip portions which are furthest away from the insertion hole 54a (55a, 56a). Herein, the insertion portions 55, 56 have the same structure, and the insertion portion 54 and the insertion portions 55, 56 have the same structure except the slit's direction (angle).

As shown in FIG. 3, the thermally-conductive bolt 44 is a metal-made bolt which comprises a head portion 44a to be received into a fastening tool (not illustrated) and a shaft portion 44b which is continuous to the head portion 44a. The shaft portion 44b includes a sleeve portion 44c which is continuous to the head portion 44a and a screw portion 44d which is continuous to the sleeve portion 44c and has a smaller diameter than the sleeve portion 44c. The diameter of the sleeve portion 44c is greater than that of the screw portion 44h1 of the bolt hole 44h, which is set to be smaller than the twice of the length of the slit 54b (55b, 56b). Thereby, when the thermally-conductive bolt 44 is fastened to the bolt hole 44h through the insertion portion 54 (55, 56), the thermally-conductive bolt 44 progresses, bending a circumferential portion of the insertion hole 54a (55a, 56a), specifically, a portion of the thermally-conductive member 50 which is positioned between the plural slits (a portion between the slit 54b (55b, 56b) and the slit 54b (55b, 56b) which crosses this slit), toward a fastening direction (rearward). The length, in the axial direction, of the sleeve portion 44c is set so that the pressing force of the thermally-conductive bolt 44 which acts on the thermally-conductive member 50 can reach a specified pressure when a rear end of the sleeve portion 44c comes to contact a bottom portion of the seat portion 44h2. Specifically, the length, in the axial direction, of the sleeve portion 44c is set so that the pressing force of the thermally-conductive bolt 44 can be within a range of 100-700 kPa and also reach a pressing-force value which does not make the folding line 52a of the thermally-conductive member 50 bend completely (keeping a specified curvature) when the rear end of the sleeve portion 44c contacts the bottom portion of the seat portion 44h2 and thereby the fastening has been accomplished.

Hereafter, the airbag 60 will be described. As shown in FIGS. 1, 2 and 4, the airbag 60 presses the thermally-conductive member 50 from one side (forward side), in its thickness direction, of the thermally-conductive member 50 with a uniform pressing force when the pressurized air is filled therein, thereby being deployed. The thermally-conductive member 50 pressed by the airbag 60 is face contacted to the front end face of the stator core 21, the coil end 23, and the inner peripheral face 31c of the housing 30 with the uniform pressing force. The airbag 60 comprises a bag body 61 which is made of a ring-shaped single bag capable of storing the pressurized air therein, a pipe-shaped introduction portion 62 which is coupled to the bag body 61, and a pressure-adjusting valve 63 (corresponding to a valve of the present invention) which supplies the pressurized air into the bag body 61 through the introduction portion 62 and regulates the pressure of the supplied air at a specified pressure value.

The bag body 61 is made from fiber-reinforced rubber and its surface is treated. Any rubber material having the heat resistance and the oil resistance, such as Si (silicon rubber), FKM (fluororubber), IIR (isobutylene-isoprene rubber), EPDM (ethylene-propylene rubber), CR (chloroprene rubber), or NBR (nitrile rubber), is used as the rubber of a main material. Aramid, copper wire, synthetic fiber, or the like is applicable to a fiber-reinforcing material to be contained in the rubber material. PEEK coating, polyimide coating, polyamide imide coating, or the like is used as the surface treatment.

In a non-deployment state in which the pressurized air is exhausted from the airbag 60, the bag body 61 is arranged in the space portion 33 and the introduction portion 62 penetrates the air introduction holes 41b, 32b so as to be exposed to the outside. The pressure-adjusting valve 63 attached to the tip of the introduction portion 62 adjusts the inner pressure of the bag body 61 at a specified pressure value, 100-700 kPa over the atmospheric pressure, for example, when the pressurized air is supplied from a pressurized-air supply device (not illustrated). In a deployment state in which the pressurized air is filled, the position, in the axial direction, of the airbag 60 is regulated by three of the ring portion 41 of the pressing plate 40, the front end face 23c of the large-diameter portion 23a of the coil end 23, and the front end face of the stator core 21. Further, the position, in the radial direction, of the airbag 60 is regulated by two of the outer peripheral face 23d of the large-diameter portion 23a and the inner peripheral face 31c of the housing body 31. Even in a case in which regulating of the radial-direction position by the outer peripheral face 23d of the large-diameter portion 23a and the inner peripheral face 31c of the housing body 31 is released for some reason of an impact, a vibration or the like, since the cylindrical portion 42 of the pressing plate 40 supports the airbag 60, the radial-direction position of the airbag 60 is maintained, so that the airbag 60 is not detached from the space portion 33.

Next, the order of attachment of the thermally-conductive members 50 will be described. The rotor 10, the stator 20 and others are assembled in the housing body 31 first. Subsequently, the plural thermally-conductive members 50 are arranged in the circumferential direction along the front end face 23c of the coil end 23, and a shape of each of the thermally-conductive members 50 is arranged so as to fit the recess portion 31a and the inner peripheral face 31c of the housing body 31, the front end face of the stator core 21, and the front end face 23c and the outer peripheral face 23d of the coil end 23. The folding line 52a of the thermally-conductive member 50 whose shape has been arranged as described above comprises a portion which is positioned in parallel to the shaft center of the rotor shaft 11 and another portion which is positioned perpendicularly to the shaft center of the rotor shaft 11.

Next, the thermally-conductive members 50 are positioned each such that the insertion portions 54-56 respectively overlap with the three bolt holes 44h as one set. In a state after this positioning, each of the thermally-conductive members 50 is configured to have a slack part 50a which excessively protrudes inward in the radial direction inside the recess portion 24 of the coil end 23. This is because any damage of the thermally-conducive member 50 which may be caused by heat shrinking of the stator 20 or the housing 30 or the like is suppressed by the slack part 50a.

Then, the pressing plate 40 is temporarily placed in a state the bag body 61 of the airbag 60 is arranged on the outer peripheral side of the cylindrical portion 42 of the pressing plate 40, and the plural thermally-conductive bolts 44 are inserted into the insertion holes 41a of the ring portion 41. At the same time, the introduction portion 62 of the airbag 60 is inserted into the air introduction hole 41b of the ring portion 41. Then, after the positioning of the insertion holes 41a of the ring portion 41 with the insertion portions 54-56 of the thermally-conductive members 50, a work of fixing the thermally-conductive members 50 to the housing body 31, i.e., a work of fastening the plural thermally-conductive bolts 44 into the bolt holes 44h of the recess portion 31a, is started.

Figure 8:
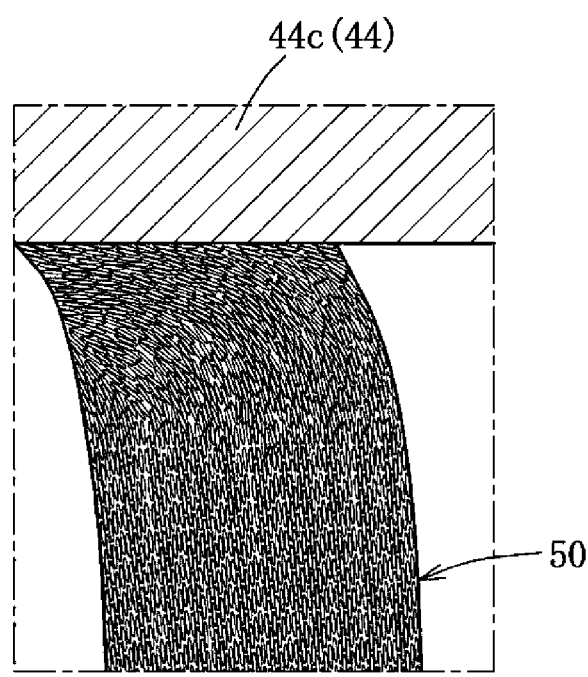
FIG. 8 is an enlarged view of a contact portion of a thermally-conductive bolt and the thermally-conductive member.

When the thermally-conductive bolts 44 are inserted into the insertion portions 54 (55, 56) of the thermally-conductive members 50 and fastened into the bolt holes 44h of the housing body 31, the sleeve portions 44c of the thermally-conductive bolts 44 progress toward the fastening direction (rearward), dragging circumferential portions of the insertion holes 54a (55a, 56a) and the slits 54b (55b, 56b), so that these dragged portions are bent toward the fastening direction and then come to be face contacted tightly to the peripheral faces of the sleeve portions 44c. Thereby, as shown in FIG. 8, the scaly graphite which constitutes each of the thermally-conductive members 50 is shifted toward the fastening direction, so that the scaly graphite is face contacted tightly to the peripheral face of the sleeve portion 44c. Consequently, as shown by arrows in FIG. 3, the heat is transmitted to the housing 30 from the thermally-conductive members 50 via the thermally-conductive bolts 44 in addition to the heat being transmitted directly to the housing 30 from the thermally-conductive members 50.

The sleeve portion 44c reaches the bottom portion 44h2, and thereby fastening of the thermally-conductive bolt 44 is complete. Herein, the tension acting on the thermally-conductive bolt 44 in a state of the bolt's completion of the bolt is set at a predetermined value. Thus, the thermally-conductive members 50 are fixed to the recess portion 31a without being bent at the folding lines 52a.

Next, after positioning of the housing body 31 and the housing rear end member 32 such that the bolt holes 34h overlap with the insertion holes 32a is compete, the bolts 34 are fastened. Concurrently, the introduction portion 32 is inserted into the air introduction hole 32b. Finally, the pressurized air is supplied by the pressurized-air supply device so that the air pressure in the airbag 60 can be the specified pressure value. Thereby, the plural thermally-conductive members 50 are face contacted to the inner peripheral face 31c of the housing body 31, the front end face of the stator core 21, and the front end face 23c and the outer peripheral face 23d of the coil end 23 with the uniform pressing force. Herein, since the present embodiment uses the distribution-winding type of stator coil 22, a contact area of the coil end 23 with the thermally-conductive members 50 (i.e., a heat input area) becomes large, so that the direct heat-transmission passage to the housing 30 from the coil end 23 can be ensured sufficiently. Accordingly, the coil end 23 can be sufficiently cooled even if the lubricant oil for cooling is not supplied.

Further, in the present embodiment, the housing 30 and a metal-made base 90 are connected via a thermally-conductive member 80 which is similar to the thermally-conductive member 50 as shown in FIG. 1. Specifically, an intermediate portion, in the axial direction, of the housing body 31 and a one-end portion of the thermally-conductive member 80 are fastened by bolts and the other-end portion of the thermally-conductive member 80 and the base 90 are fastened by bolts. Thereby, the quantity of heat transmitted to the housing 30 from the coil end 23 is not only radiated to the atmosphere from the housing 30 but directly transmitted to the base 90 through the thermally-conductive member 80.

Hereafter, the performances/effects of the cooling structure of the electric motor 1 according to the first embodiment described above will be described. According to the above-described first embodiment, since the plural thermally-conductive members 50 including the laminated graphite sheets 52 are provided so as to contact the housing 30 and the coil end 23, respectively, (so as to thermally connect the housing 30 and the coil end 23), the coil end 23 can be sufficiently cooled by the heat radiation from the coil end 23 to the housing 30 via the thermally-conductive members 50. Also, since the cooling performance of the coil end 23 is increased by the thermally-conductive members 50, any coolant for heat exchange, such as the lubricant oil, is possibly omitted. Further, since the airbag 60 which stores the pressurized air is deployed in the space portion 33 between the inner wall (housing end member 32) of the housing 30 and the coil end 23, the thermally-conductive members 50 can be face contacted to the coil end 23 with the uniform pressing force by utilizing the pressure of the pressurized air regardless of a shape of the space portion 33. Thus, the first embodiment can cool the coil end 23 sufficiently, properly ensuring the air insulation layer (the space portion 33) which is necessary between the coil end 23 and the housing 30 from the safety perspective.

Since the inner pressure of the airbag 60 is set at 100-700 kPa in the first embodiment, the thermally-conductive members 50 can be made to perform the superior thermal conductivity surely.

In the first embodiment, there are provided the plural thermally-conductive members 50 which are arranged in the circumferential direction inside the space portion 33, and the airbag 60 comprises the single bag body 61 which is configured to collectively press the plural thermally-conductive members 50. Thereby, the plural thermally-conductive members 50 can be collectively pressed by the airbag 60 (the bag body 61) having a relatively simple shape.

In the first embodiment, the airbag 60 further comprises the introduction portion 62 provided to penetrate the hosing end member 32 which constitutes the front end all portion of the housing 30 and the pressure-adjusting valve 63 provided at the tip of the introduction portion 62. Thereby, since the airbag 60 can be deployed after the airbag 60 in a non-deployment state is attached, the assembling workability can be improved and also pressure controlling of the airbag 60 can be facilitated.

In the first embodiment, since the graphite sheet 52 is folded back plural times with the folding lines 52a which are parallel to the shaft center of the rotor 10, the thermally-conductive member 50 can increase the amount of heat transmission by way of a heat-transmission passage from the coil end 23 to the housing 30.

In the first embodiment, the thermally-conductive member 50 has the slack part 50a at the position between the portion pressed against the coil end 23 (the front end face 23c and the outer peripheral face 23d of the large-diameter portion 23a) by the airbag 60 and the portion fixed to the housing 30 (the recess portion 31a), the slack part 50a being configured to be bent and not be fixed to any member. Thereby, since the slack part 50a serves as a portion which can suppress a large tension from acting on the thermally-conductive member 50, which is caused by thermal contraction of the housing 30 or the like, any damage of the thermally-conductive member 50 can be prevented.

In the first embodiment, the thermally-conductive member 50 has the through hole 54a (55a, 56a) and the plural slits 54b (55b, 56b) configured to radically extend from the through hole 54a (55a, 56a) at the portion fixedly fastened to the housing 30 (the recess portion 31a) by the thermally-conductive bolts 44, and the thermally-conductive bolts 44 are configured to penetrate the through hole 54a (55a, 56a) and bend the portion of the thermally-conductive member 50 which is positioned between or among the slits 54b (55b, 56b) in the fastening direction. Thereby, since the heat is transmitted to the housing 30 from the thermally-conductive member 50 via the thermally-conductive bolts 44 in addition to the heat being transmitted directly to the housing 30 from the thermally-conductive member 50, the thermal conductivity can be improved, thereby cooling the coil end 23 sufficiently.

Next, some partial modifications of the above-described first embodiment will be described. While the above-described first embodiment exemplified the thermally-conductive member which is configured such that the graphite sheet is folded back twenty-eight times with the parallel two-side folding lines, the folding time of the graphite sheet can be set at any time properly. Further, while the long-shaped thermally-conductive members were exemplified, trapezoidal thermally-conductive members may be prepared and spread radially on the coil end without any space between them. While the graphite sheet having the thickness of about 75 μm was used in the first embodiment, any graphite sheet having any thickness is applicable. In a case in which a thinner graphite sheet is used, the holding time can be increased, keeping a constant thickness of the thermally-conductive member, thereby increasing the thermal conductivity of the thermally-conductive member. As a method for thinning the graphite sheet the most, the single layer crystal having the thickness of the single atom, i.e., the graphene (graphene sheet), may be used as the graphite sheet.

While the thermally-conductive member of the first embodiment is formed by folding the single graphite sheet the plural times, it may be formed by pilling up plural separated graphite sheets in the thickness direction of the thermally-conductive member. That is, the thermally-conductive member of the present invention includes any one which is made of the laminated graphite sheet. Herein, the meaning of "laminated" of the "laminated graphite sheet" includes both a manner in which plural separated graphite sheets are piled up in the thickness direction and another manner in which the single sheet of graphite is folded into plural layers.

While the first embodiment exemplified the distribution-winding type as a winding type of the stator coil, the present invention is applicable to a concentrated-winding type of electric motor. That is, the present invention is applicable to any type of electric motor as long as the thermally-conductive member can be face contacted to both the coil end and the housing.

While the electric motor of the first embodiment is cooled by the dry-type cooling using the thermally-conductive member only, the wet-type cooling in which liquid coolant (water or oil) is supplied to the inside of the housing of the electric motor and cooling is done by heat exchange with this liquid coolant may be used in addition to the dry-type cooling. Further, an air-cooling mechanism to promote the heat exchange with outside air by providing fins or the like at the housing is possibly provided additionally.

While the first embodiment described the example in which the bag body of the airbag is made from fiber-reinforced material, fiber for reinforcement may be omitted as long as a sufficient strength can be obtained. In this case, a local unevenness in a tensional stress (a causing point of breakage) does not occur at the bag body, so that the bag body can be suppressed from getting broken.

Embodiment 2

Figure 9:
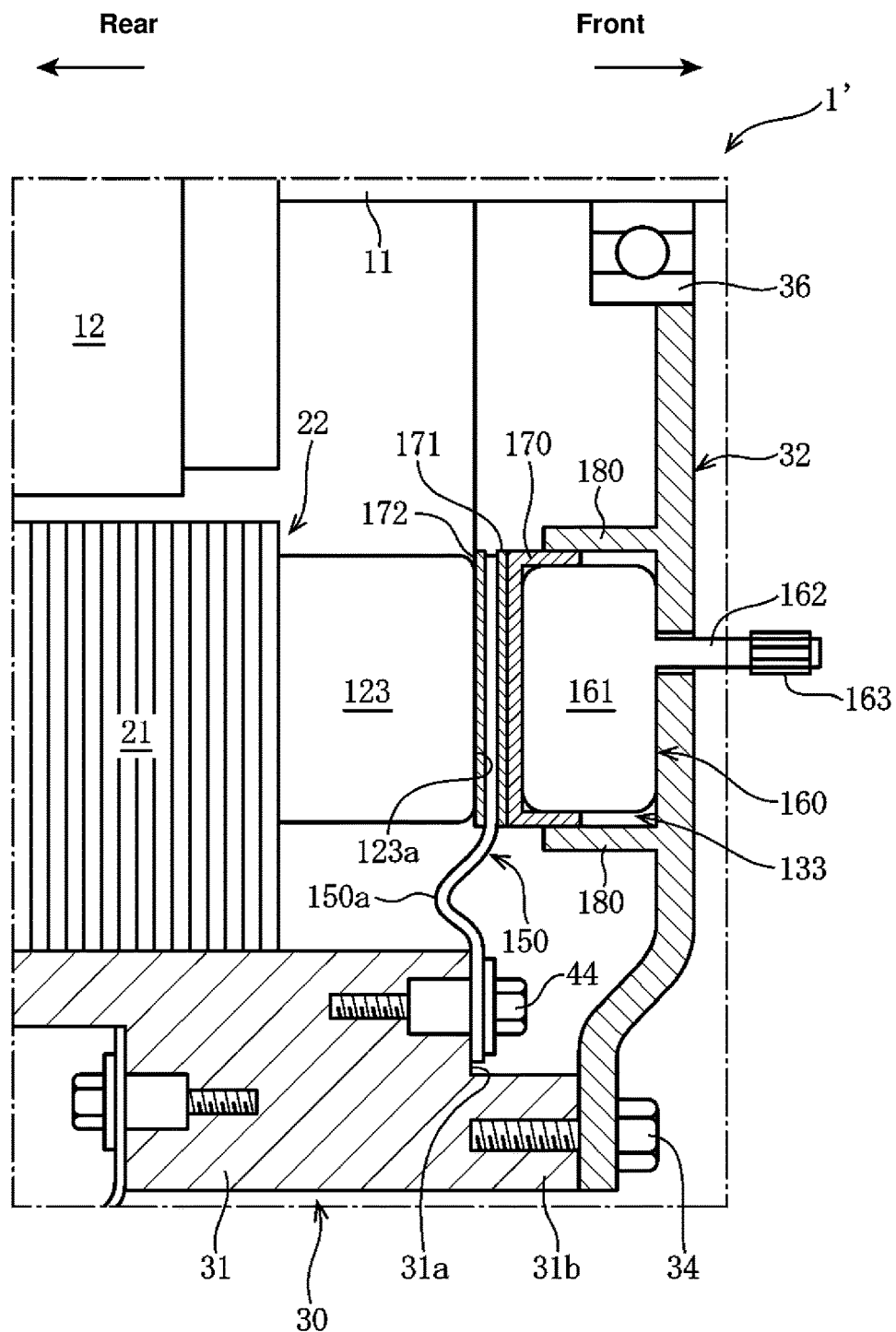
FIG. 9 is a view for describing a second embodiment of the present invention, which corresponds to FIG. 2.

A second embodiment of the present invention will be described referring to FIG. 9. In FIG. 9 showing the second embodiment, the same elements as the first embodiment (FIGS. 1-8) are denoted by the same reference characters, detailed descriptions of which will be omitted. In an electric motor 1' of the second embodiment shown in FIG. 9, a coil end 123 of the stator coil 22 is formed in a short cylindrical shape having roughly constant inner and outer diameters differently from the coil end 23 (a shape having the large-diameter portion 23a and the small-diameter portion 23b) of the first embodiment. An outward end portion, in the radial direction, of a thermally-conductive member 150 is fixed to the recess portion 31a of the housing body 31 by the thermally-conductive bolt 44. The thermally-conductive member 150 includes the laminated graphite sheet similarly to the thermally-conductive member 50 of the first embodiment.

An airbag 160 in the non-deployment state is arranged in a space portion 133 between the coil end 123 and the hosing end member 32. The airbag 160 comprises a bag body 161 which is made of a ring-shaped single bag, an introduction portion 162 which extends forward from the bag body 161 and penetrates the housing end member 32, and a pressure-adjusting valve 163 which is attached to the introduction portion 162. The bag body 161 is configured to fill the space portion 133 when being deployed by the pressurized air introduced through the introduction portion 162. An inward portion, in the radial direction, of the thermally-conductive member 150 is arranged between the airbag 160 and the coil end 123. The thermally-conductive portion 150 is pressed against a front end face 123a of the coil end 123 when receiving the pressure of the pressurized air in the airbag 160 in accordance with deployment (inflation) of the airbag 160 inside the space portion 133.

A pair of front-and-rear insulation sheets 171, 172 which are made of a plate-shaped insulator having the superior thermal conductivity are at a portion of the thermally-conductive member 150 which is positioned between the airbag 160 and the coil end 123. That is, the front-side insulation sheet 171 is attached to a front face of the thermally-conductive member 150, and the rear-side insulation sheet 172 is attached to a rear face of the thermally-conductive member 150. A support member 170 having a U-shaped cross section is attached in front of the front-side insulation sheet 171 so as to cover the bag body 161 of the airbag 160 from behind. That is, the airbag 160 is contacted to the thermally-conductive member 150 via the support emmer 170 and the insulation sheet 171, and the thermally-conductive member 150 is contacted to the front end face 123a of the coil end 123 via the insulation sheet 172. Herein, the insulating heat-dissipation paste which can compatibly perform the insulation and the thermal conductivity is applied to the front end face 123a of the coil end 123, illustration of which is omitted.

The thermally-conductive member 150 which has been pressed against the coil end 123 and fixed to the housing body 31 in the above-described manner performs transmitting most of the heat of the coil end 123 to the housing body 31 (the housing 30). That is, the thermally-conductive member 150 thermally connects the coil end 123 and the housing 30. The thermally-conductive member 150 has a bending slack part 150a which is not fixed to any member at an intermediate portion, in the radial direction, thereof, that is—a portion thereof which is pressed against the coil end 123 by the airbag 160 and another portion thereof which is fixed to the housing body 31 by the thermally-conductive bolt 44. This slack part 150a is provided in order to suppress any damage of the thermally-conductive member 150 which is caused by thermal contraction of the housing 30 or the like, similarly to the slack part 50a of the first embodiment.

A pair of projecting walls 180 which project rearward at inward and outward positions, in the radial direction, of the support member 170 are provided at the housing end member 32. Thus, the pair of projecting walls 180 are provided to interpose the support member 170 covering the airbag 160 between them, whereby the airbag 160 is positioned at a specified location, in the radial direction, (between the pair of projecting walls 180) relative to the housing end member 32. That is, a position regulating mechanism to regulate the position, in the radial direction, of the airbag 160 relative to the housing end member 32 is configured by the support member 170 and the pair of projecting walls 180. Thereby, the thermally-conductive member 150 can be properly pressed against the coil end 123 by the airbag 160 whose position is regulated at the specified radial position relative to the housing end member 32.

The present invention should not be limited to the above-described embodiments, and any other modifications or improvements may be applied within the scope of a spirit of the present invention.

What is claimed is:

1. A cooling structure of an electric motor comprising a rotor, a stator provided with a wound stator coil, and a housing accommodating the rotor and the stator, wherein a coil end of the stator is spaced apart from an inner wall of the housing, the cooling structure of the electric motor comprising:
   a thermally-conductive member provided to thermally connect the housing and the coil end and including a laminated graphite sheet; and
   an airbag configured to be deployed in a space portion between the inner wall of the housing and the coil end so as to press at least a portion of the thermally-conductive member against the coil end by means of a pressure of pressurized air therein.

2. The cooling structure of the electric motor of claim 1, wherein said thermally-conductive member is composed of plural elements arranged in a circumferential direction inside said space portion, and said airbag comprises a single bag body configured to collectively press said plural elements of the thermally-conductive member.

3. The cooling structure of the electric motor of claim 1, wherein said housing comprises a tubal housing body surrounding an outer periphery of the rotor and the stator and a housing end member closing an end portion, in an axial direction, of the hosing body, and said airbag is provided between an end portion, in an axial direction, of said coil end and said housing end member so as to press said thermally-conductive member in a thickness direction of the thermally-conductive member against the end portion, in the axial direction, of the coil end.

4. The cooling structure of the electric motor of claim 3, further comprising a position regulating mechanism configured to regulate a position, in a radial direction, of said airbag relative to said housing end member.

5. The cooling structure of the electric motor of claim 3, wherein said airbag comprises a bag body configured to be deployed between said end portion, in the axial direction, of the coil end and said housing end member, an introduction portion provided to penetrate said hosing end member and introduce the pressurized air into said bag body, and a valve provided at said introduction portion.

6. The cooling structure of the electric motor of claim 3, wherein there is provided a fixation device to fix said thermally-conductive member to said housing, and the thermally-conductive member has a slack part at a position between a portion thereof which is pressed against said coil end by said airbag and another portion thereof which is fixed to the housing by said fixation device, the slack part being configured to be bent and not be fixed to any member.

7. The cooling structure of the electric motor of claim 3, wherein there is provided a fastening member to fixedly fasten said thermally-conductive member to said housing, the thermally-conductive member has a through hole and plural slits configured to radically extend from the through hole at a portion thereof which is fixedly fastened to the housing by said fastening member, and the fastening member is configured to penetrate said through hole and bend a portion of the thermally-conductive member which is positioned between or among said slits in a fastening direction.

* * * * *